(12) United States Patent
Adlersberg et al.

(10) Patent No.: US 11,323,278 B1
(45) Date of Patent: May 3, 2022

(54) DEVICE, SYSTEM, AND METHOD OF GENERATING AND UTILIZING VISUAL REPRESENTATIONS FOR AUDIO MEETINGS

(71) Applicant: AudioCodes Ltd., Lod (IL)

(72) Inventors: Shabtai Adlersberg, Ra'anana (IL); Menachem Honig, Metar (IL); Tatiana Adar, Belle Mead, NJ (US)

(73) Assignee: AUDIOCODES LTD., Lod (IL)

( * ) Notice: Subject to any disclaimer, the term of this patent is extended or adjusted under 35 U.S.C. 154(b) by 0 days.

(21) Appl. No.: 17/089,836

(22) Filed: Nov. 5, 2020

(51) Int. Cl.
*G06F 15/16* (2006.01)
*H04L 12/18* (2006.01)

(52) U.S. Cl.
CPC ...... *H04L 12/1831* (2013.01); *H04L 12/1818* (2013.01)

(58) Field of Classification Search
None
See application file for complete search history.

(56) References Cited

U.S. PATENT DOCUMENTS

| | | | | |
|---|---|---|---|---|
| 7,298,930 B1 * | 11/2007 | Erol | | G06K 9/00711 |
| | | | | 382/305 |
| 11,095,468 B1 * | 8/2021 | Pandey | | G06F 16/90324 |
| 2007/0022159 A1 * | 1/2007 | Zhu | | H04L 12/1831 |
| | | | | 709/204 |
| 2008/0316944 A1 | 12/2008 | Nachum | | |
| 2015/0106091 A1 * | 4/2015 | Wetjen | | H04M 3/568 |
| | | | | 704/235 |
| 2017/0278518 A1 | 9/2017 | Kashtan | | |
| 2018/0027351 A1 * | 1/2018 | Cartwright | | H04S 7/303 |
| | | | | 381/303 |
| 2018/0040325 A1 | 2/2018 | Melanson | | |
| 2018/0232129 A1 * | 8/2018 | Quinn | | G06K 9/4676 |
| 2019/0273767 A1 * | 9/2019 | Nelson | | H04L 65/403 |
| 2020/0183969 A1 * | 6/2020 | Wiesel | | G06F 16/538 |
| 2020/0211561 A1 * | 7/2020 | Degraye | | G10L 15/30 |
| 2021/0097293 A1 * | 4/2021 | Avrionov | | G06K 9/6202 |

FOREIGN PATENT DOCUMENTS

WO    WO-2017020011 A1 *   2/2017   ........... G06F 16/685

* cited by examiner

*Primary Examiner* — Phyllis A Book
(74) *Attorney, Agent, or Firm* — Eitan Mehulal Sadot (57) ABSTRACT

Devices, systems, and methods of generating and utilizing visual representations for audio meetings. A method includes: receiving an audio recording of a meeting having multiple participants; determining, for each meeting participant, time-slots in which that meeting participant spoke during the meeting; generating and displaying an audio playback progress bar which visually differentiates among time-slots of different meeting participants. Hovering or selection of a particular time-point on the audio progress bar, causes generation and display of a textual phrase that was uttered at that time-point by a meeting participant, together with an indication of the speaker; and optionally with several other preceding phrases and following phrases. Transcript portions are also color-coded or visually-coded, to efficiently distinguish among phrases of various meeting participants.

18 Claims, 4 Drawing Sheets

DEVICE, SYSTEM, AND METHOD OF GENERATING AND UTILIZING VISUAL REPRESENTATIONS FOR AUDIO MEETINGS

FIELD

The present invention is related to the field of Information Technology and Communication systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

SUMMARY

The present invention may include, for example, systems, devices, and methods for automatic generation of visual representations for audio meetings.

For example, a method includes: receiving an audio recording of a meeting having multiple participants; determining, for each meeting participant, time-slots in which that meeting participant spoke during the meeting; generating and displaying an interactive and user-responsive audio playback progress bar, which visually differentiates among time-slots of different meeting participants. Hovering or selection of a particular time-point on the audio progress bar, causes generation and display of a textual phrase that was uttered at that time-point by a meeting participant, together with an indication of the speaker; and optionally with several other preceding phrases and following phrases. Transcript portions are also color-coded or visually-coded, to efficiently distinguish among phrases of various meeting participants.

The present invention may provide other and/or additional benefits or advantages.

DETAILED DESCRIPTION OF SOME DEMONSTRATIVE EMBODIMENTS

The Applicants have realized that many meetings and business discussions are performed via an audio conferencing platform or an audio/video conferencing platform. Such platforms enable multiple users to utilize their end-user devices (e.g., smartphone, tablet, desktop computer, laptop computer) to engage in a multi-person audio meeting or audio/video meeting. The meeting audio (and optionally its video) may be recorded, and may later be subject to Automatic Speech Recognition (ASR) for the purpose of generating a textual transcript of such meeting.

Figure 1A:
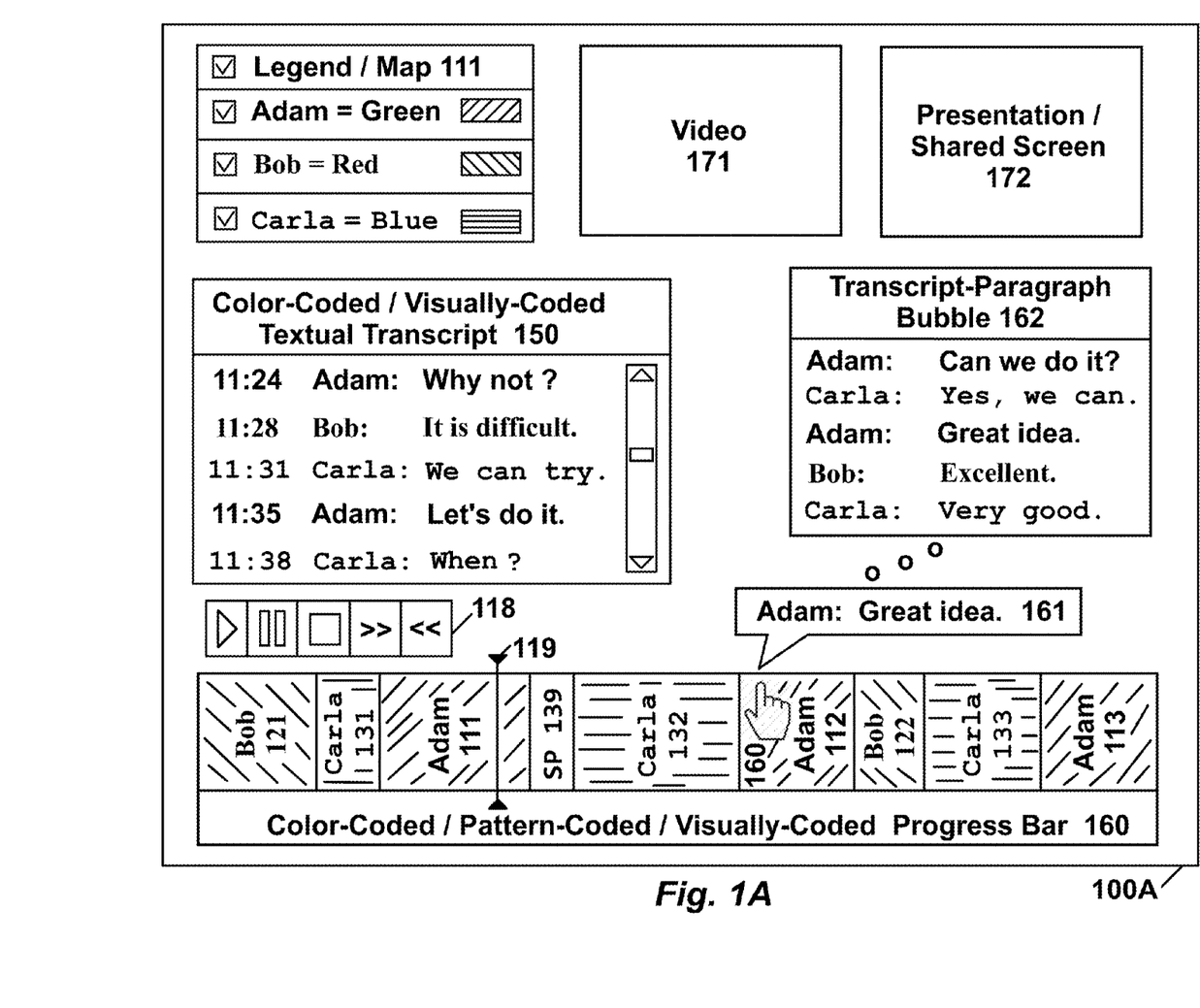
FIGS. 1A-1C are schematic illustrations of interactive output screens, which may be generated, displayed and utilized in accordance with some demonstrative embodiments of the present invention.
Figure 1B:
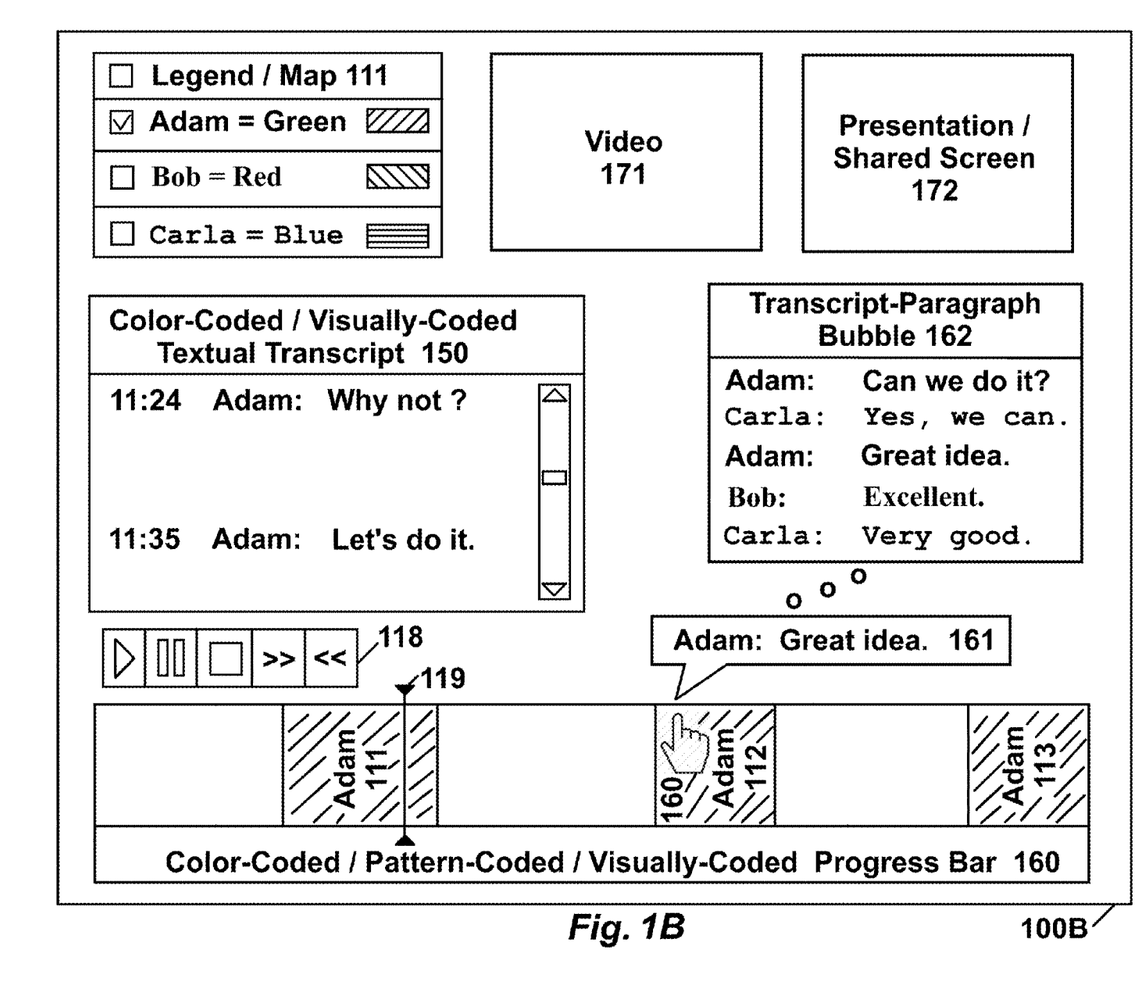
Figure 1C:
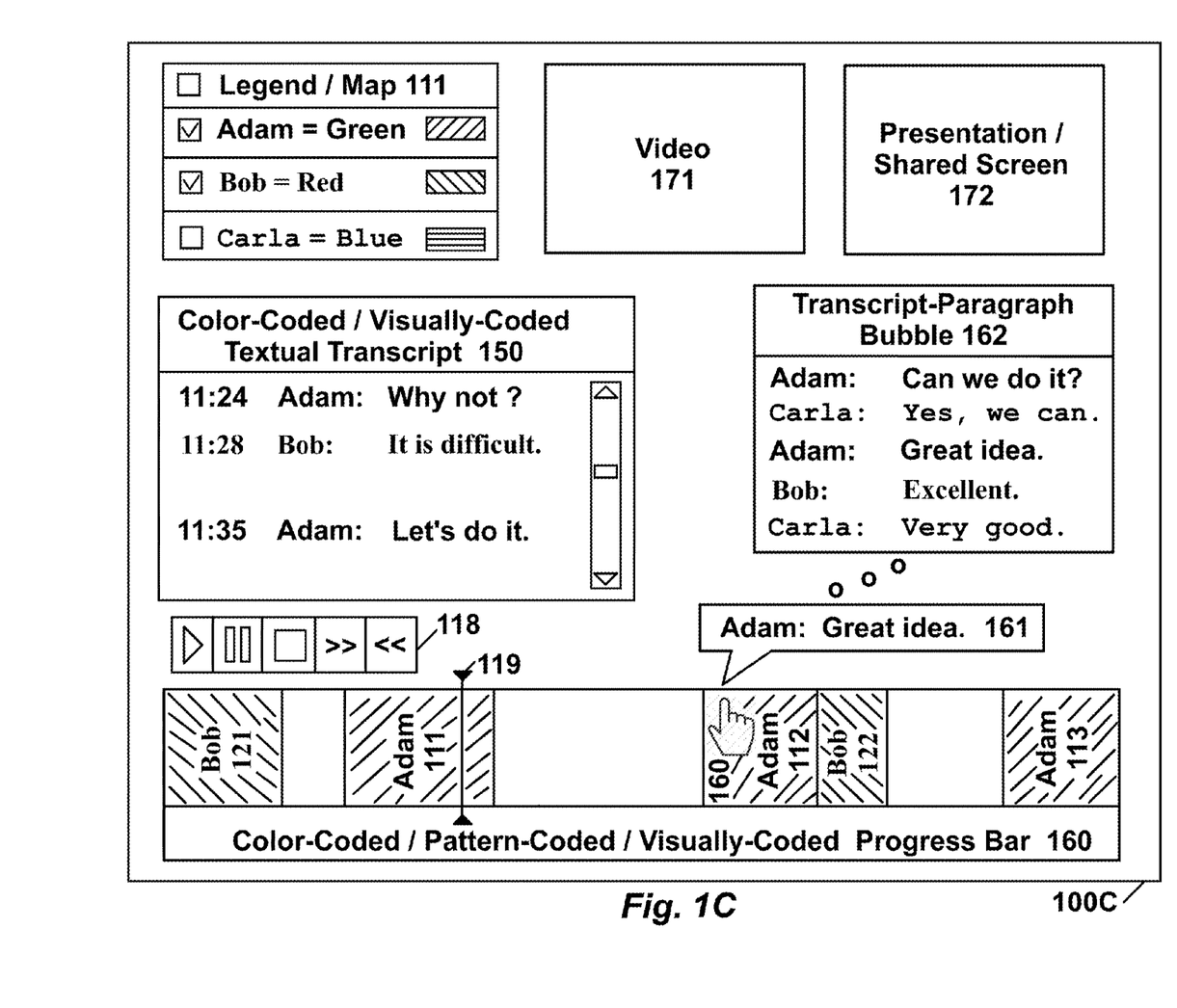

Reference is made to FIGS. 1A-1C, which are schematic illustration of interactive output screens 100A-100C, respectively, which may be generated, displayed and utilized in accordance with some demonstrative embodiments of the present invention. FIGS. 1A-1C are shown as black-and-white drawings; however, in accordance with the present invention, the actual interactive output screens 100A-100C may be colorful and may include color-coded or visually-coded information or indicia or indications, that is represented in the drawings with different Font Types and/or with different Fill Patterns. For example, time-slots and fonts that are shown in Font Arial, may be displayed in Green color in the actual screens; whereas time-slots and fonts that are shown in Font Times New Roman, may be displayed in Red color in the actual screen; whereas, time-slots and fonts that are shown in Font Courier, may be displayed in Blue color in the actual screen.

The Applicants have realized that in a conventional system, a recorded audio of a multi-person meeting may be difficult and inefficient for navigating or for subsequent reviewing. For example, three participants (Adam, Bob, Carla) participated in a 60-minute meeting, and a 60-minute audio clip is generated for subsequent playback, as well as a textual meeting transcript that is 700 lines long.

The Applicants have realized that in a conventional system, it is difficult and inefficient to review such lengthy audio recording or such lengthy textual transcript. For example, in a conventional system, a conventional "progress bar" is displayed, enabling a user to play the recorded audio or to "blindly" skip forward or backward using such "progress bar", attempting to guess where to find a particular meeting portion in which participant Adam has spoken; or attempting to find a particular meeting portion in which user Carla has responded to a question that User Bob has posed. The Applicants have realized that a conventional "progress bar" provides no help and no clues to the user to achieve such goals.

The Applicants have devised a unique system and method which enables rapid and efficient reviewing, as well as selective playback and pin-pointed playback, of segments-of-interest from such lengthy audio recording and/or from such lengthy transcript.

In accordance with some embodiments, the 60-minute audio recording of the meeting is processed and analyzed by the system of the present invention, which generates an on-screen representation that indicates meeting-potions or meeting-segments in which each participant has spoken. For example, as demonstrated in FIG. 1A, the system and method of the present invention generate a Color-Coded/Pattern-Coded/Visually-Coded Progress Bar 110, which includes different visual representations for time-segments in which different participants have spoken. For example, time-slots 111, 112 and 113 are shown in a first color and/or in a first visual pattern, to indicate that user Adam spoke during these time-slots. Time-slots 121 and 122 are shown in a second color and/or in a second visual pattern, to indicate that user Bob spoke during these time-slots. Time-slots 121 and 122 are shown in a second color and/or in a second visual pattern, to indicate that user Bob spoke during these time-slots. Time-slots 131, 132 and 133 are shown in a third color and/or in a third visual pattern, to indicate that user Carla spoke during these time-slots. Optionally, a Visual Legend/Map 111 indicates which color (and/or which visual pattern) corresponds to which particular participant. A Current Playback Spot Indicator 119 indicates or represents the time-point of the currently-played time-point of the recorded audio. A Playback Control GUI 118 enables the user to command or trigger modifications to the audio playback; for example, demonstrating from left to right, Play, Pause, Stop, Fast-Forward (or skip forward T seconds), Rewind (or skip back T seconds); other suitable GUI elements may be used.

Accordingly, instead of a conventional "progress bar" that does not provide any useful information to the viewer or listener, the present invention generates and provides the Color-Coded/Pattern-Coded/Visually-Coded Progress Bar 110 which enables users to efficiently and rapidly seek and find particular segments-of-interest in the recorded meeting. For example, it is now easy and efficient for a user to immediately and directly access the particular time-slots of the audio (and/or video) recording of the meeting in which user Bob spoke, based on the unique color and/or pattern that visually indicate those time-slots within the meeting. Similarly, it is now easy and efficient for a user to immediately find the meeting-segment in which user Carla has responded to a question posed by user Adam: the Color-Coded/Pattern-Coded/Visually-Coded Progress Bar 110 shows exactly one occurrence in which user Carla has spoken immediately after user Adam (in their consecutive time slots 132 and 122, respectively), thereby enabling a user to directly access that particular segment of the recorded meeting.

In some embodiments, a silence time-slot having a length of at least T seconds (e.g., at least 2 seconds), may be represented Color-Coded/Pattern-Coded/Visually-Coded Progress Bar 110 by its own color or pattern or other visual characteristic to indicate long periods of silence. In some embodiments, a silence time-slot having a length of up to T seconds (e.g., up to 2 seconds), may be joined or merged with the immediately preceding non-silence time-slot, or with the next non-silence time-slot that immediately follows such silence time-slot. For demonstrative purposes, a silence time-slot 139 is indicated as a separate time-slot in in the Color-Coded/Pattern-Coded/Visually-Coded Progress Bar 110, that is not merged with a preceding or a following non-silence time-slot.

Furthermore, as demonstrated in FIG. 1B, the Color-Coded/Pattern-Coded/Visually-Coded Progress Bar 110 may be commanded by the user to show with a particular color or visual pattern only the time-slots that correspond to a particular meeting participant, and to "hide" or to show in a neutral color or a black color or a background color the time-slots that corresponds to other meeting participants. For example, the user may click on the name of a particular participant, such as user Adam, or may select only that participant in the Map/Legend 111, and/or may de-select or un-select the other participants in the Map Legend 111; and in response, the Color-Coded/Pattern-Coded/Visually-Coded Progress Bar 110 that was shown in FIG. 1A and that has indicated the time-slots of the three different participants using three different colors and/or patterns, changes its appearance to indicate only time-slots 111, 112 and 113 (of user Adam), while hiding or not-showing in a unique color or pattern the time-slots of the other two users. The interactive representations shown in FIG. 1B enables the user to even more rapidly and more efficiently find, access, and review only the particular time-slots in which a particular participant had spoken. Accordingly, a user that wishes to review only the audio (and/or video) segments of the recorded meeting, in which user Adam spoke, can now access those particular time-slots rapidly, directly, and efficiently.

As demonstrated in FIGS. 1A-1C, the system and method of the present invention enable a user to efficiently utilize a digital recording of a meeting, in order to rapidly obtain from it answers to queries such as, for example, "what did user Bob say in that meeting", or "what did user Carla respond to the question of user Adam in that meeting".

Furthermore, the Color-Coded/Pattern-Coded/Visually-Coded Progress Bar 110, in its full-participant version of FIG. 1A and/or in its particular-participant version of FIG. 1B, also enables a user to rapidly see and to visualize the relative participation rates of the different meeting participants. For example, the Color-Coded/Pattern-Coded/Visually-Coded Progress Bar 110 enables a user to see, visually and quickly, that Green-colored time-slots are numerous and occupy a large percentage of the Color-Coded/Pattern-Coded/Visually-Coded Progress Bar 110, indicating that the corresponding participant has spoken for a large percentage of the entire meeting length and has spoken numerous times during the meeting; while also showing in the same Color-Coded/Pattern-Coded/Visually-Coded Progress Bar 110 that another participant, associated with Yellow colored time-slots, has spoken only two times during the meeting, and each time was short. Similarly, the Color-Coded/Pattern-Coded/Visually-Coded Progress Bar 110 of FIG. 1B may show, for a single particular participant, a visual representation that enables to visualize and understand quickly, whether that particular user has spoken many times or few times during the meeting, and whether the particular user has spoken in lengthy time-slots or short ones.

FIG. 1C further demonstrates how the system of the present invention enables to select only some, but not all, of the meeting participants; thereby causing the Color-Coded/Pattern-Coded/Visually-Coded Progress Bar 110 to indicate therein, via color coding and/or pattern coding, only the time-slots which correspond to those selected participants. For example, the user may select, from the list of participants, users Adam and Bob but not Carla; thereby causing the Color-Coded/Pattern-Coded/Visually-Coded Progress Bar 110 to show only the time-slots of participants Adam and Bob, and not to show the time-slots of user Carla. This may enable the reviewing user to focus his review of the recorded meeting, only on the desired time-slots of those two particular participants. For example, it may enable the reviewing user to more easily and quickly find the time-segment in which user Bob has responded to a question posed by user Adam; as the Color-Coded/Pattern-Coded/Visually-Coded Progress Bar 110 now shows only the time-slots of these two users.

In accordance with the present invention, a textual transcript of the recorded audio (and/or video) of the meeting is further generated and displayed, in an interactive manner that is also color-coded and/or pattern-coded, to enable rapid and efficient review and retrieval of particular portions-of-interest of the textual transcript. For example, as shown in FIG. 1A, a Color-Coded/Visually-Coded Textual Transcript 150 is displayed, showing the text said by each participant by using the particular color that is associated with that user; such as, showing the text spoken by user Adam in a first visual manner (e.g., in color Green, and/or in font Arial); showing the text spoken by user Bob in a second, different, visual manner (e.g., in color Red, and/or in font Times New Roman); showing the text spoken by user Carla in a third, different, visual manner (e.g., in color Blue, and/or in font Courier); and so forth. The Color-Coded/Visually-Coded Textual Transcript 150 may optionally show also the time-point at which each phrase or sentence of the transcript has commenced, relative to the beginning of the entire audio recording. Accordingly, the textual transcript of the recorded meeting is now more navigatable and usable by a reviewing user, enabling such user to easily and rapidly review the particular transcript portions that were said by a particular user.

Furthermore, as shown in FIG. 1B, the reviewing user may select (e.g., using the selection boxes of participants in the Legend/Map 111) a single particular meeting participant (such as user Adam); and in response to such selection, only the transcript portions of that selected participant are displayed, or are displayed prominently; while the text portions that were said by other participants are hidden entirely, or are shown in a grayed-out manner or in a faint color; thereby enabling the reviewing user to easily read and review only the transcript portions that were said by participant Adam.

Similarly, as shown in FIG. 1C, the reviewing user may select some (but not all) of the meeting participants (such as users Adam and Bob), using the selection boxes of participants in the Legend/Map 111; and in response to such selection, only the transcript portions of those selected participants are displayed, or are displayed prominently; while the text portions that were said by other participant(s) are hidden entirely, or are shown in a grayed-out manner or in a faint color; thereby enabling the reviewing user to easily read and review only the transcript portions that were said by those selected participants (Adam and Bob).

The system and method of the present invention may further provide additional useful visual information to the reviewing user, upon the hovering of the reviewing user over a particular point in the Color-Coded/Pattern-Coded/Visually-Coded Progress Bar 110; such as, upon the utilization of an on-screen pointer (e.g., controlled via a computer mouse, or a touch-pad) to hover upon a particular point in the Color-Coded/Pattern-Coded/Visually-Coded Progress Bar 110, or upon the tap or click of the user (e.g., via a touch-screen) on a particular point of the Color-Coded/Pattern-Coded/Visually-Coded Progress Bar 110. Upon such engagement of the reviewing user with a particular User-Engagement Point 160 of the Color-Coded/Pattern-Coded/Visually-Coded Progress Bar 110, one or both of the following two items are displayed: (a) a Current Transcript Phrase 161, which is displayed immediately above (or under) the User-Engagement Point 160, showing the particular textual phrase (from the textual transcript of the recorded audio) that corresponds to that particular User-Engagement Point 160; (b) a Transcript-Paragraph Bubble 162 is generated and displayed, near the User-Engagement Point 160, showing in it not only the current textual phrase that was uttered at this particular User-Engagement Point 160, but also showing the preceding N1 phrases that immediately preceded it (e.g., N1 being 1 or 2 or 3 or other suitable value), and showing the following N2 phrases that immediately followed it (e.g., N2 being 1 or 2 or 3 or other suitable value).

In the example shown in FIGS. 1A-1C, the Transcript-Paragraph Bubble 162 includes a total of Five phrases: the current phrase that corresponds to the particular User-Engagement Point 160, and the two phrases that immediately preceded it, and the two phrases that immediately followed it; thereby enabling the reviewing user to easily and efficiently see the Context in which the currently-hovered (or currently-engaged) phrase was said.

Optionally, the phrase or phrases that are shown in the Current Transcript Phrase 161 and/or in the Transcript-Paragraph Bubble 162, are also color-coded or visual pattern coded, to enable even further assistance in understanding and visualizing which participant said which phrase. For example, if the currently-engaged time-point in the particular User-Engagement Point 160 corresponds to a phrase uttered by user Adam, which is associated with color Green, then the Current Transcript Phrase 161 is displayed in color Green, to further indicate to the reviewing user that this phrase was uttered by participant Adam. In some embodiments, additionally or alternatively, the Current Transcript Phrase 161 may be displayed after a label or a caption of "Adam:", to further indicate to the reviewing user that this particular phrase in the transcript was uttered by participant Adam. Similarly, the text portion that is shown in the Transcript-Paragraph Bubble 162 may be color-coded or otherwise visually coded (e.g., using different font size, font types, font effects, highlighting, or the like); such that phrases that are displayed within the Transcript-Paragraph Bubble 162 are shown in different colors to reflect that they were spoken by different corresponding participants of the meeting.

Optionally, the interactive output screen may further include one or more other information items; for example, a screen-portion showing playback of a Video 171 that was recorded for that meeting (e.g., of a particular participant; or of several participants in a Grid view; or of the currently-talking participant); screen-portions showing a Presentation and/or a Shared Screen 172 that were shown or shared during the meeting; or the like.

Figure 2:
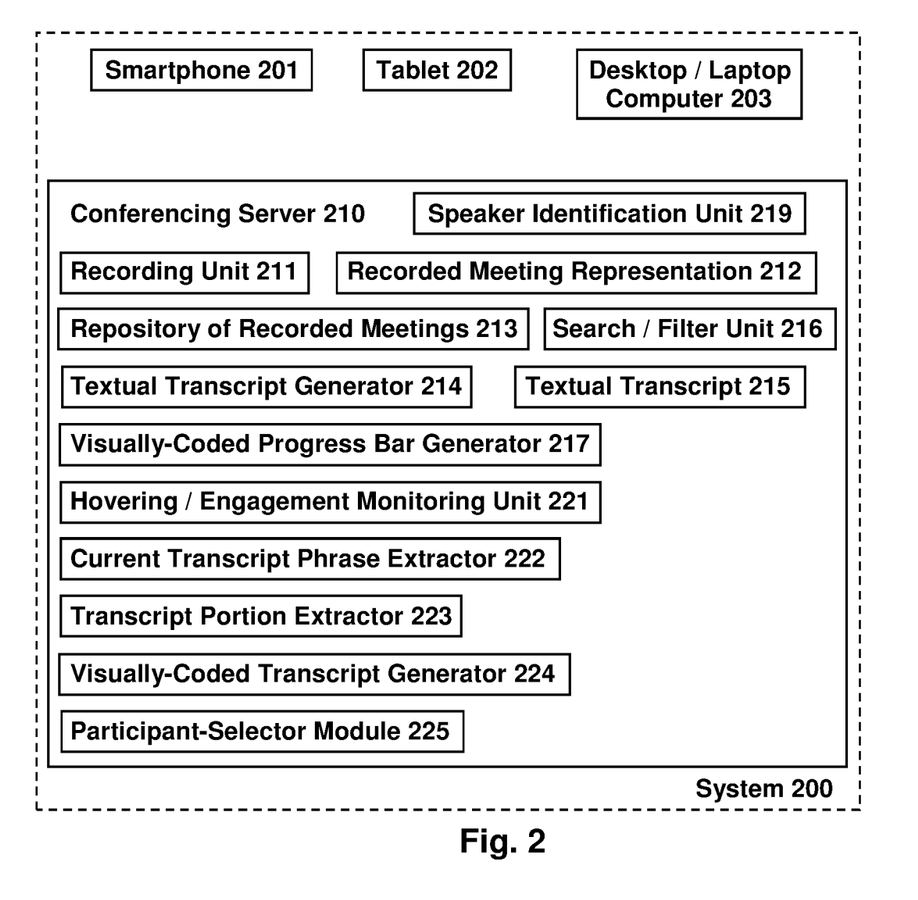
FIG. 2 is a schematic block-diagram illustration of a system, in accordance with some demonstrative embodiments of the present invention.

Reference is made to FIG. 2, which is a schematic block-diagram illustration of a system 200, in accordance with some demonstrative embodiments of the present invention. System 200 may comprise multiple end-user devices that are utilized by multiple participants to participate in an audio or audio/video conference or meeting. For example, participant Adam may utilize a smartphone 201; participant Bob may utilize a tablet 202; participant Carla may utilize a desktop/laptop computer 203. Each one of them connects to a Conferencing Server 210, via a telephony connection or system, via an Internet Protocol (IP) based connection or system, via a Voice over IP (VoIP) connection or system, via a cellular link or network, via a wireless (e.g., Wi-Fi) link or network, via a wired or land-line connection, or the like.

Conferencing Server 210 receives the multiple incoming channels of audio, and outputs in real time a mixture or a multiplexing of the audio channels as a unified audio that all the meeting participants can hear. Optionally, Conferencing Server 210 further outputs or serves video content and/or visual content; for example, video that is incoming from one or more of the end-user devices 201-203 (e.g., video from a camera of such end-user device, showing the participant); a video or a presentation or a shared screen, which may be shared or launched by one of the meeting participants; an image or photo or other graphic file that a participant shares; a chat box or a chat panel enabling a meeting participant to exchange textual messages, with all the other meeting participants (public chat comment) or with one or more particular meeting participants (private chat comment); or the like.

Audio, and optionally video and other content, of the conference or meeting is recorded by a Recording Unit 211 which generates a Recorded Meeting Representation 212. The recorded audio (and/or other video and/or data) is stored in a Repository of Recorded Meetings 213.

A Speaker Identification Unit 219 operates to identify the speaker of each word or phrase or sentence that is uttered in the audio of the meeting. The speaker identification may be performed, for example, based on the communication channel from which each audio portion was received; such that, for example, audio utterances that arrived from the communication link of smartphone 201 would be associated with user Adam (the end-user of smartphone 201) as the speaker;

whereas, audio utterances that arrived from the communication link of tablet 202 would be associated with user Bob (the end-user of tablet 202) as the speaker; whereas, audio utterances that arrived from the communication link of computer 203 would be associated with user Carla (the end-user of computer 203) as the speaker; and so forth. The name of each participant may be derived, for example, from a nickname or screen-name or user-name or participant name that each such participant may be required to enter or to type or to say when he joins the conference; or may be derived from a unique identifier or token that is included in the meeting invitation that was sent to each participant and which may optionally include a unique participant identifier therein, which identifies the participant uniquely upon its engagement with the link; or may be derived from a different meeting joining code that was distributed to different participants prior to the meeting; or may be derived from voice recognition and/or speaker recognition algorithms. Some embodiments may optionally utilize one or more other suitable Speaker Identification techniques; for example, one or more of the methods, operations and/or components which are described in patent application publications US 2008/0316944 A1 and/or US 2017/0278518 A1 and/or US 2018/0040325 A1, which are hereby incorporated by reference in their entirety.

A Textual Transcript Generator 214 operates to generate a Textual Transcript 215 for the recorded meeting, using a speech-to-text converter or an Automatic Speech Recognition (ASR) unit. The Textual Transcript 215 indicates, for each word or phrase or sentence therein, the time-point in which that phrase was uttered, and/or the time-slot (e.g., with a granularity of several seconds) in which that phrase was uttered, and/or the name or title or other identifier of the particular participant that uttered that word or phrase (e.g., since the Conferencing Server 210 keeps track which audio input or audio channel was received from which participant; or based on other suitable techniques for speaker identification).

A Visually-Coded Progress Bar Generator 217 operates to automatically construct a visually-coded (e.g., color coded, pattern coded, or the like) progress bar, which indicates in different visual manners (e.g., different colors, different pattern or filling texture) the time-slots of different speakers or participants (and optionally, silence periods). For example, the Visually-Coded Progress Bar Generator 217 may firstly determine that the entire length of the audio recording is 30 minutes, which is 1,800 seconds; and may allocate and generate an on-screen rectangle of 900 pixels wide by 20 pixels high, corresponding to those 1,800 seconds of audio recording. Accordingly, each on-screen pixel-wide line in the progress bar, corresponds to 2 seconds of recorded audio. Then, the Visually-Coded Progress Bar Generator 217 analyzes the audio recording and its transcript, and assigns a Color or a Pattern or other visual characteristic to each one of the 900 time-slots or pixel-wide rectangles, based on the speaker that spoke during each such time-slot. For example, each participant is firstly assigned a particular color or pattern, such that Adam is Green, and Bob is Red, and Carla is Blue; the Visually-Coded Progress Bar Generator 217 determines that in the first 10 seconds of the audio recording, user Adam has spoken, and therefore the Visually-Coded Progress Bar Generator 217 paints a Green rectangle having width of 5 pixels (corresponding to 10 seconds) and height of 20 pixels. Then, the Visually-Coded Progress Bar Generator 217 determines that in the next 6 seconds of the audio recording, user Bob has spoken, and therefore the Visually-Coded Progress Bar Generator 217 paints a Red rectangle having width of 3 pixels (corresponding to 6 seconds) and height of 20 pixels. The processing and the preparation of the visually-coded progress bar continue along the entire audio recording, using the textual transcript that was generated and which also indicates the identity of each speaker at every time-point of the audio recording. The processing and the generation of the visually-coded progress bar may be a one-time processing task, which may be performed automatically with regard to any audio recording that was added to the repository, immediately upon the end of the meeting, or at a later time, or even in real time or in near-real-time as audio is being recorded and then processed. The system may use the Visually-Coded Progress Bar Generator 217 to generate one time the visually-coded progress bar for a given meeting having a given audio recording, and a representation of the generated visually-coded progress bar may be added to the Repository of Recorded Meetings 213, as an additional record or data-item that is associated with the corresponding recorded meeting; or may be stored in a separate repository of visually-coded progress bar representations, together with a meeting identifier that links between the progress bar representation and its corresponding meeting audio recording.

Optionally, one or more of the meeting participants, and/or one or more other users which may be referred to as a "reviewing user", may have access to a Recorded Meeting Representation 212, in order to review the recorded audio (and/or video) as well as the corresponding textual transcript. The reviewing user may optionally utilize a Search/Filter Unit 216, to browse or search the Repository of Recorded Meetings 213, and to retrieve from it and access a particular Recorded Meeting Representation 212. The retrieved meeting audio recording can be played via an on-screen playback GUI. Additionally, instead of displaying a conventional participant-agnostic audio progress bar, the screen of the electronic device of the reviewing user shows the visually-coded progress bar, which indicates via different visual effects (colors, patterns, fill textures) the different time-slots that correspond to different talking participants.

A Hovering/Engagement Monitoring Unit 221 operates to detect that an on-screen pointer (e.g., controlled by a mouse or touch-pad) hovers upon a particular point of the visually-coded progress bar, or that the reviewing user engages (e.g., clicks, taps) via a touch-screen with a particular point of the visually-coded progress bar. The Hovering/Engagement Monitoring Unit 221 determines which on-screen coordinates were engaged or hovered; such as, determines that the 43rd pixel from the left end of the visually-coded progress bar is engaged or hovered. A Current Transcript Phrase Extractor 222 converts the on-screen location to a time-point within the recorded audio; for example, in the above-mentioned example, each pixel-wide line in the progress bar corresponds to two seconds of audio; and therefore the 43rd pixel from the left corresponds to the 86th second and the 87th second of audio. The Current Transcript Phrase Extractor 222 obtains or extracts from the textual transcript of the meeting, the particular phrase(s) that were uttered or said at this particular time-point or in this short-length time-slot; and presents them as a Current Transcript Phrase in proximity to the on-screen location that the reviewing user has clicked or tapped or hovered. The textual phrase is presented, in some embodiments, using the same visual coding (e.g., color, font type, font size, or the like) that is associated with the particular participant that spoke in that time-slot.

Similarly, a Transcript Portion Extractor 223 uses that same identified time-point, and extracts from the textual transcript, for example, the N phrases that preceded it and the M phrases that followed it; and generates a paragraph of several sentences that is shown as a "bubble" or other on-screen display, in proximity to the point in the progress bar that the reviewing user has hovered or clicked or tapped. The displayed Transcript Portion may further show the names of the participant that spoke each of the displayed phrase; and may utilize the same participant-specific color or visual effect (e.g., font type, font size, or the like) that are associated with each A Visually-Coded Transcript Generator 224 operates to generates and display, on the screen of the reviewing user, a visually-coded transcript of the recorded meeting, such that each participant is pre-allocated one or more unique visual characteristics (e.g., font color, font type, font size), thereby generating a unique visually-coded transcript that emphases and indicates with different visual styles the phrases uttered by different participants. For example, the Visually-Coded Transcript Generator 224 generates an on-screen textual transcript representation in which phrases uttered by participant Adam are shown in a first visual manner (e.g., in color Green, and/or in font Arial); whereas phrases uttered by participant Bob are shown in a second, different, visual manner (e.g., in color Red, and/or in font Times New Roman); and whereas phrases uttered by participant Carla are shown in a third, different, visual manner (e.g., in color Blue, and/or in font Courier).

A Participant-Selector Module 225 enables the reviewing user to select only a single participant in the meeting, or some or all of the participants; and upon such user selection, the Participant-Selector Module 225 triggers other units or modules to modify their operational status or their properties and to adapt the displayed information to the selected participant(s). For example, the reviewing user may select only one participant (Adam) and may de-select or un-select the other participants (Bob, Carla); and in response to such selection, the Visually-Coded Progress Bar Generator 217 modifies the content and the appearance of the visually-coded progress bar such that it would now include visual emphasis only of the time-slots of the selected participant Adam, without visually indicating the time-slots of each of the other participants. Similarly, such selection of only participant Adam, causes the Visually-Coded Transcript Generator 224 to present only the text of the transcript portions that were uttered by participant Adam, and to hide or remove from the screen the transcript portions that were uttered by other participants (or, to cause such other transcript portions to be visually de-emphasized, or grayed-out, or shown in faint color or gray color). Similarly, a selection of two participants out of three participants, causes the Visually-Coded Progress Bar to show only their time-slots (each selected participant indicated by its own unique color or pattern or texture filling), and also causes the displayed transcript to show (or to emphasize) only the transcript portions that correspond to the selected participants.

In some embodiments, a method comprises: (a) receiving an audio recording of a meeting having multiple participants; (b) determining, for each meeting participant, time-slots in which said meeting participant spoke during said meeting; (c) generating and displaying an interactive audio playback progress bar which visually differentiates among time-slots of different meeting participants.

In some embodiments, step (c) comprises: generating and displaying said audio playback progress bar which comprises at least: (i) a first set of time-slot indications, colored in a first color, corresponding to time-slots in which a first particular meeting participant spoke; (ii) a second set of time-slot indications, colored in a second color, corresponding to time-slots in which a second particular meeting participant spoke.

In some embodiments, step (c) comprises: generating and displaying said audio playback progress bar which comprises at least: (i) a first set of time-slot indications, displayed with a first texture filling, corresponding to time-slots in which a first particular meeting participant spoke; (ii) a second set of time-slot indications, displayed with a second texture filling, corresponding to time-slots in which a second particular meeting participant spoke.

In some embodiments, step (c) comprises: generating and displaying said audio playback progress bar which comprises at least: (i) a first set of time-slot indications, displayed with a first visual characteristic, corresponding to time-slots in which a first particular meeting participant spoke; (ii) a second set of time-slot indications, displayed with a second, different visual characteristic, corresponding to time-slots in which a second particular meeting participant spoke.

In some embodiments, step (c) comprises: receiving a user selection of a single meeting participant; updating a display of said audio playback progress bar, to visually indicate therein only time-slots corresponding to speech by said single particular meeting participant and not by other meeting participants.

In some embodiments, step (c) comprises: receiving a user selection of some, but not all, meeting participants; updating a display of said audio playback progress bar, to visually indicate therein only time-slots corresponding to speech by said some meeting participants and not by other meeting participants.

In some embodiments, the method comprises: (d) generating a textual transcript of said meeting, in which phrases that were uttered by a first meeting participant are colored in a first color, and phrases that were uttered by a second meeting participant are colored in a second, different, color.

In some embodiments, the method comprises: (d) generating a textual transcript of said meeting, in which phrases that were uttered by a first meeting participant are displayed in a first font style, and phrases that were uttered by a second meeting participant are displayed in a second, different, font style.

In some embodiments, the method comprises: (d) generating a textual transcript of said meeting, in which phrases that were uttered by a first meeting participant are emphasized via a first visual effect, and phrases that were uttered by a second meeting participant are emphasized via a second, different, visual effect.

In some embodiments, the method comprises: (d) generating a textual transcript of said meeting; (e) receiving a user selection of a single meeting participant; (f) in response to said user selection, generating and displaying only portions of said textual transcript of said meeting that correspond to phrases uttered by said single meeting participant; and hiding portions of the textual transcript of said meeting that correspond to phrases uttered by other meeting participants.

In some embodiments, the method comprises: (d) generating a textual transcript of said meeting; (e) receiving a user selection of some, but not all, meeting participants; (f) in response to said user selection, generating and displaying only portions of said textual transcript of said meeting that correspond to phrases uttered by said some meeting participants, using a different color or visual effect for phrases uttered by each meeting participant; and hiding portions of the textual transcript of said meeting that correspond to phrases uttered by other meeting participants.

In some embodiments, the method comprises: receiving a user input which hovers upon or selects a particular time-point in said audio playback progress bar; determining a phrase that was uttered by a meeting participant during said particular time-point; displaying a textual representation of said phrase in proximity to said particular time-point of said audio playback progress bar.

In some embodiments, the method comprises: receiving a user input which hovers upon or selects a particular time-point in said audio playback progress bar; determining a phrase that was uttered by a meeting participant during said particular time-point; displaying (i) a textual representation of said phrase in proximity to said particular time-point of said audio playback progress bar, accompanied by (ii) an indication of which meeting participant has uttered said phrase.

In some embodiments, the method comprises: receiving a user input which hovers upon or selects a particular time-point in said audio playback progress bar; determining a phrase that was uttered by a meeting participant during said particular time-point; determining preceding N phrases that were uttered by meeting participants immediately prior to said phrase, wherein N is a natural number; determining M subsequent phrases that were uttered by meeting participants immediately after said phrase, wherein M is a natural number; generating a textual paragraph that includes said N preceding phrases, said phrase, and said M subsequent phrases; and displaying said textual paragraph in proximity to said particular time-point of said audio playback progress bar.

In some embodiments, displaying said textual paragraph comprises: displaying said textual paragraph by using different on-screen colors for phrases that were uttered, respectively, by different meeting participants.

In some embodiments, the method comprises: storing a representation of said audio playback progress bar, which visually differentiates among time-slots of different meeting participants, in a repository of audio recordings of meetings, as an accompanying data-item that is associated with a particular audio recording of a particular meeting.

In some embodiments, the interactive audio playback progress bar enables visual differentiation among time-slots of different meeting participants, and further enables a user to selectively view time-slots of a particular user-selected participant, and further enables a user to selectively hear meeting audio segments that correspond only to time-slots of a particular user-selected participant.

Some embodiments include a non-transitory storage medium having stored thereon instructions that, when executed by one or more processors, cause the one or more processors to perform a method as described.

Some embodiments include a system comprising: one or more processors, operably associated with one or more memory units; wherein the one or more processors are configured to perform a method as described.

In accordance with the present invention, each one of the devices or units of system 100 may be implemented by using (or may comprise) one or more hardware units and/or software units, processors, CPUs, DSPs, integrated circuits, memory units, storage units, wireless communication modems or transmitters or receivers or transceivers, cellular transceivers, a power source, input units, output units, Operating System (OS), drivers, applications, and/or other suitable components.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The present invention may be implemented by using hardware units, software units, processors, CPUs, DSPs, integrated circuits, memory units, storage units, wireless communication modems or transmitters or receivers or transceivers, cellular transceivers, a power source, input units, output units, Operating System (OS), drivers, applications, and/or other suitable components.

The present invention may be implemented by using a special-purpose machine or a specific-purpose that is not a generic computer, or by using a non-generic computer or a non-general computer or machine. Such system or device may utilize or may comprise one or more units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

The present invention may be implemented by using code or program code or machine-readable instructions or machine-readable code, which is stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such device to perform a method in accordance with the present invention.

Embodiments of the present invention may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Rust, Cobol, Fortran, ActionScript, AJAX, XML, JSON, Lisp, Eiffel, Verilog, Hardware Description Language (HDL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results, among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method comprising:
receiving an audio recording of a meeting having multiple participants;
determining, for each meeting participant, time-slots in which said meeting participant spoke during said meeting;
generating and displaying an interactive audio playback progress bar which visually differentiates among time-slots of different meeting participants;
receiving a user input which hovers upon or selects a particular time-point in said audio playback progress bar;
determining a phrase that was uttered by a meeting participant during said particular time-point;
determining preceding N phrases that were uttered by meeting participants immediately prior to said phrase, wherein N is a natural number;
determining M subsequent phrases that were uttered by meeting participants immediately after said phrase, wherein M is a natural number;
generating a textual paragraph that includes said N preceding phrases, said phrase, and said M subsequent phrases; and
displaying said textual paragraph in proximity to said particular time-point of said audio playback progress bar.

2. The method of claim 1,
wherein:
said audio playback progress bar comprises at least:
a first set of time-slot indications, colored in a first color, corresponding to time-slots in which a first particular meeting participant spoke; and
a second set of time-slot indications, colored in a second color, corresponding to time-slots in which a second particular meeting participant spoke.

3. The method of claim 1,
wherein:
said audio playback progress bar comprises at least:
a first set of time-slot indications, displayed with a first texture filling, corresponding to time-slots in which a first particular meeting participant spoke; and
a second set of time-slot indications, displayed with a second texture filling, corresponding to time-slots in which a second particular meeting participant spoke.

4. The method of claim 1,
wherein:
said audio playback progress bar comprises at least:
a first set of time-slot indications, displayed with a first visual characteristic, corresponding to time-slots in which a first particular meeting participant spoke; and
a second set of time-slot indications, displayed with a second, different visual characteristic, corresponding to time-slots in which a second particular meeting participant spoke.

5. The method of claim 1, further comprising:
receiving a user selection of a single meeting participant;
updating a display of said audio playback progress bar, to visually indicate therein only time-slots corresponding to speech by said single particular meeting participant and not by other meeting participants.

6. The method of claim 1, further comprising:
receiving a user selection of some, but not all, meeting participants;
updating a display of said audio playback progress bar, to visually indicate therein only time-slots corresponding to speech by said some meeting participants and not by other meeting participants.

7. The method of claim 1, further comprising:
generating a textual transcript of said meeting, in which phrases that were uttered by a first meeting participant are colored in a first color, and phrases that were uttered by a second meeting participant are colored in a second, different, color.

8. The method of claim 1, further comprising:
generating a textual transcript of said meeting, in which phrases that were uttered by a first meeting participant are displayed in a first font style, and phrases that were uttered by a second meeting participant are displayed in a second, different, font style.

9. The method of claim 1, further comprising:
generating a textual transcript of said meeting, in which phrases that were uttered by a first meeting participant are emphasized via a first visual effect, and phrases that were uttered by a second meeting participant are emphasized via a second, different, visual effect.

10. The method of claim 1, further comprising:
generating a textual transcript of said meeting;
receiving a user selection of a single meeting participant; and
in response to said user selection, generating and displaying only portions of said textual transcript of said meeting that correspond to phrases uttered by said single meeting participant;
and hiding portions of the textual transcript of said meeting that correspond to phrases uttered by other meeting participants.

11. The method of claim 1, further comprising:
generating a textual transcript of said meeting;
receiving a user selection of some, but not all, meeting participants; and
in response to said user selection, generating and displaying only portions of said textual transcript of said meeting that correspond to phrases uttered by said some meeting participants, using a different color or visual effect for phrases uttered by each meeting participant; and hiding portions of the textual transcript of said meeting that correspond to phrases uttered by other meeting participants.

12. The method of claim 1, further comprising:
receiving a user input which hovers upon or selects a particular time-point in said audio playback progress bar;
determining a phrase that was uttered by a meeting participant during said particular time-point; and
displaying a textual representation of said phrase in proximity to said particular time-point of said audio playback progress bar.

13. The method of claim 1, further comprising:
receiving a user input which hovers upon or selects a particular time-point in said audio playback progress bar;
determining a phrase that was uttered by a meeting participant during said particular time-point; and
displaying a textual representation of said phrase in proximity to said particular time-point of said audio playback progress bar, accompanied by an indication of which meeting participant has uttered said phrase.

14. The method of claim 1,
wherein displaying said textual paragraph comprises:

displaying said textual paragraph by using different on-screen colors for phrases that were uttered, respectively, by different meeting participants.

15. The method of claim 1, further comprising:
storing a representation of said audio playback progress bar, which visually differentiates among time-slots of different meeting participants, in a repository of audio recordings of meetings, as an accompanying data-item that is associated with a particular audio recording of a particular meeting.

16. The method of claim 1,
wherein the interactive audio playback progress bar enables visual differentiation among time-slots of different meeting participants, and further enables a user to selectively view time-slots of a particular user-selected participant, and further enables a user to selectively hear meeting audio segments that correspond only to time-slots of a particular user-selected participant.

17. A non-transitory storage medium having stored thereon instructions that, when executed by one or more processors, cause the one or more processors to perform a method comprising:
receiving an audio recording of a meeting having multiple participants;
determining, for each meeting participant, time-slots in which said meeting participant spoke during said meeting;
generating and displaying an interactive audio playback progress bar which visually differentiates among time-slots of different meeting participants;
receiving a user input which hovers upon or selects a particular time-point in said audio playback progress bar;
determining a phrase that was uttered by a meeting participant during said particular time-point;
determining preceding N phrases that were uttered by meeting participants immediately prior to said phrase, wherein N is a natural number;
determining M subsequent phrases that were uttered by meeting participants immediately after said phrase, wherein M is a natural number;
generating a textual paragraph that includes said N preceding phrases, said phrase, and said M subsequent phrases; and
displaying said textual paragraph in proximity to said particular time-point of said audio playback progress bar.

18. A system comprising:
one or more processors, operably associated with one or more memory units,
wherein the one or more processors are configured:
to receive an audio recording of a meeting having multiple participants;
to determine, for each meeting participant, time-slots in which said meeting participant spoke during said meeting;
to generate, and to cause a display unit to display, an interactive audio playback progress bar which visually differentiates among time-slots of different meeting participants;
to receive a user input which hovers upon or selects a particular time-point in said audio playback progress bar;
to determine a phrase that was uttered by a meeting participant during said particular time-point;
to determine preceding N phrases that were uttered by meeting participants immediately prior to said phrase, wherein N is a natural number;
to determine M subsequent phrases that were uttered by meeting participants immediately after said phrase, wherein M is a natural number;
to generate a textual paragraph that includes said N preceding phrases, said phrase, and said M subsequent phrases; and
to display said textual paragraph in proximity to said particular time-point of said audio playback progress bar.

* * * * *